(12) United States Patent
Wang et al.

(10) Patent No.: US 10,834,503 B2
(45) Date of Patent: *Nov. 10, 2020

(54) RECORDING METHOD, RECORDING PLAY METHOD, APPARATUSES, AND TERMINALS

(71) Applicant: Huawei Technologies Co., Ltd., Shenzhen (CN)

(72) Inventors: Zhihua Wang, Wuhan (CN); Bo Han, Shanghai (CN); Jie Liu, Xi'an (CN); Wei Yang, Wuhan (CN); Xiong Zhou, Wuhan (CN); Li Liu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/812,813

(22) Filed: Mar. 9, 2020

(65) Prior Publication Data

US 2020/0213727 A1    Jul. 2, 2020

Related U.S. Application Data

(63) Continuation of application No. 15/778,986, filed as application No. PCT/CN2016/104364 on Nov. 2, 2016.

(30) Foreign Application Priority Data

Nov. 25, 2015    (CN) .......................... 2015 1 0831351

(51) Int. Cl.
*H04R 3/00* (2006.01)
*G10K 11/18* (2006.01)
*H04M 9/08* (2006.01)

(52) U.S. Cl.
CPC ............ *H04R 3/005* (2013.01); *G10K 11/18* (2013.01); *H04M 9/08* (2013.01); *G10K 2200/10* (2013.01); *H04R 2203/12* (2013.01)

(58) Field of Classification Search
CPC .... H04R 3/005; H04R 2203/12; G10K 11/18; G10K 2200/10; H04M 9/08
See application file for complete search history.

(56) References Cited

U.S. PATENT DOCUMENTS 7,676,372 B1    3/2010    Oba
2012/0015632 A1    1/2012    Silva
(Continued)

FOREIGN PATENT DOCUMENTS

CN    102082991 A    6/2011
CN    102281425 A    12/2011
(Continued)

OTHER PUBLICATIONS

Machine Translation and Abstract of Chinese Publication No. CN102082991, Jun. 1, 2011, 5 pages.
(Continued)

*Primary Examiner* — David L Ton
(74) *Attorney, Agent, or Firm* — Conley Rose, P.C.

(57) ABSTRACT

A recording play method, terminal and non-transitory computer-readable storage medium are provided, where the recording play method includes obtaining a recording file, wherein the recording file comprises saved recording data in all sound source directions via the at least three microphones; receiving a first gesture on an interface displayed on the screen, wherein the first gesture indicates a first recording play direction; determining, according to the first gesture, a first recording data matching the first recording play direction from the saved recording data in all sound source directions; and playing the first recording data matching the first recording play direction.

17 Claims, 6 Drawing Sheets

(56) References Cited

U.S. PATENT DOCUMENTS

| | | |
|---|---|---|
| 2012/0128160 A1 | 5/2012 | Kim et al. |
| 2013/0100236 A1 | 4/2013 | Zhan et al. |
| 2014/0108934 A1 | 4/2014 | Choi et al. |
| 2014/0376740 A1 | 12/2014 | Shigenaga et al. |
| 2016/0183026 A1 | 6/2016 | Liu et al. |
| 2016/0189728 A1 | 6/2016 | Chen et al. |
| 2016/0328134 A1 | 11/2016 | Xu |

FOREIGN PATENT DOCUMENTS

| | | |
|---|---|---|
| CN | 102395066 A | 3/2012 |
| CN | 103473028 A | 12/2013 |
| CN | 103634476 A | 3/2014 |
| CN | 103729121 A | 4/2014 |
| CN | 104378570 A | 2/2015 |
| CN | 104424953 A | 3/2015 |
| CN | 104685898 A | 6/2015 |
| WO | 2014206727 A1 | 12/2014 |

OTHER PUBLICATIONS

Machine Translation and Abstract of Chinese Publication No. CN102395066, Mar. 28, 2012, 7 pages.
Machine Translation and Abstract of Chinese Publication No. CN103634476, Mar. 12, 2014, 9 pages.
Machine Translation and Abstract of Chinese Publication No. CN104378570, Feb. 25, 2015, 34 pages.
Opa Microphones A/s, "Decca Tree," XP055551313, Nov. 1, 2015, 6 pages.
Foreign Communication From a Counterpart Application, PCT Application No. PCT/CN2016/104364, English Translation of International Search Report dated Jan. 26, 2017, 2 pages.
Foreign Communication From a Counterpart Application, PCT Application No. PCT/CN2016/104364, English Translation of Written Opinion dated Jan. 26, 2017, 4 pages.
Foreign Communication From a Counterpart Application, Chinese Application No. 201510831351.1, Chinese Office Action dated Dec. 3, 2018, 11 pages.
Foreign Communication From a Counterpart Application, European Application No. 16867857.1, Extended European Search Report dated Feb. 13, 2019, 17 pages.

RECORDING METHOD, RECORDING PLAY METHOD, APPARATUSES, AND TERMINALS

CROSS-REFERENCE TO RELATED APPLICATIONS

This application is a continuation of U.S. patent application Ser. No. 15/778,986, filed on May 24, 2018, which is a U.S. National Stage of International Patent Application No. PCT/CN2016/104364, filed on Nov. 2, 2016, which claims priority to Chinese Patent Application No. 201510831351.1, filed on Nov. 25, 2015. All of the aforementioned patent applications are hereby incorporated by reference in their entireties.

TECHNICAL FIELD

The present disclosure relates to the audio processing field, and in particular, to a recording method, a recording play method, apparatuses, and terminals.

BACKGROUND

With rapid development of communications technologies, functions of a mobile terminal become increasingly powerful, and a range and an environment of use become increasingly diverse. For example, multiple microphones may be pre-installed in a mobile terminal such as a smartphone, and recording and playing are performed according to a user's requirement using a sound source positioning technology and a directional play technology.

Currently, in a mobile terminal recording process, a recording function in a specified direction may be implemented by specifying a sound source direction and directionally processing and saving a sound obtained by combining sounds input by multiple microphones. When recording obtained sound using a directional recording solution is played, a saved recording file in a specified direction is played such that playing recording in a specified direction is implemented.

In the foregoing implementation solution for implementing directional recording and directional recording play, only functions of recording and recording play in a pre-specified direction can be implemented. When recording is played, an adjustment cannot be made in real time according to the user's requirement, and flexibility is poor.

SUMMARY

Embodiments of the present disclosure provide a recording method, a recording play method, apparatuses, and terminals to implement a direction-adjustable recording play function.

According to a first aspect, a recording method is provided. According to the method, a recording apparatus obtains recording data that is in all sound source directions and that is of multiple audio inputs, where the multiple audio inputs may be input by a microphone array, and the microphone array includes at least three microphones in order to position and obtain 360 degrees (°) sound source directions. The recording apparatus generates a recording file according to the obtained recording data, and saves, in the recording file, the recording data in all the sound source directions input by the at least three microphones such that the complete recording data is retained. When recording is played subsequently, recording data in a corresponding sound source direction can be played according to the sound source direction that is set by a user. The sound source direction of the played recording data is different when the direction that is set by the user is different such that a recording play direction can be adjusted.

In a possible design, in this embodiment of the present disclosure, a recording direction that is set by the user may be further obtained. The recording file saves the recording direction such that playing is performed according to the saved recording direction in a recording play process. The recording direction is one of at least two sound source directions obtained by the microphone array at a same time point, and the at least two sound source directions are some of all the sound source directions obtained by the at least three microphones. The recording direction may be understood as a sound source direction that needs to be emphatically recorded and that is set by the user when there is more than one sound source direction at a same time point, and there is at least one sound source direction that needs to be emphatically recorded and that is set by the user.

Optionally, the recording direction that is set by the user is determined according to a sound source adjustment gesture input by the user, and the sound source adjustment gesture is used to adjust the recording direction.

Optionally, the recording direction that is set by the user includes at least two different recording directions that are separately set by the user at different time in order to implement a recording method in which a recording direction is adjustable.

According to a second aspect, a recording play method is provided. According to the method, a recording play apparatus obtains a recording file and determines a recording play direction. The recording file saves recording data in all sound source directions input by at least three microphones. It may be understood that in the present disclosure, the recording play direction should be at least one of all the sound source directions such that the recording data saved in the recording file can be played. The recording play apparatus determines, in the recording file according to the determined recording play direction, recording data that matches the recording play direction, and plays the determined recording data in order to implement directional recording play.

It may be understood that the determined recording play direction may be any one or more of all the sound source directions. Therefore, according to the recording play method provided in this embodiment of the present disclosure, a recording play function in which a sound source direction is adjustable can be implemented.

In a possible design, the recording file saves a recording direction, and the recording play direction may be the recording direction or may be a specified play direction that is set by a user. If the user sets the specified play direction, the recording play direction is the specified play direction, or if the user does not set the specified play direction, the recording play direction is the recording direction.

Optionally, the specified play direction is determined according to a play direction adjustment gesture input by the user, and the play direction adjustment gesture is used to adjust the recording play direction.

In another possible design, the recording play direction includes a first recording play direction and a second recording play direction, and the first recording play direction and the second recording play direction are different recording play directions that are set by the user at different time points. The playing the determined recording data includes playing first recording data, where the first recording data is recording data that is determined in the recording file and that matches the first recording play direction, obtaining the play direction adjustment gesture input by the user, where the play direction adjustment gesture is used to adjust the recording play direction, and switching, according to the play direction adjustment gesture, from playing the first recording data to playing second recording data, where the second recording data is recording data that is determined in the recording file and that matches the second recording play direction. Using this design, a recording play function in which a recording play direction can be switched and adjusted can be implemented.

According to a third aspect, a recording apparatus is provided, where the recording apparatus includes an obtaining unit and a processing unit. The obtaining unit is configured to obtain recording data in all sound source directions input by at least three microphones. The processing unit is configured to generate a recording file according to the recording data obtained by the obtaining unit, where the recording file saves the recording data in all the sound source directions input by the at least three microphones. All the recording data in all the sound source directions input by the at least three microphones is saved in the recording file such that the complete recording data is retained. When recording is played subsequently, recording data in a corresponding sound source direction can be played according to the sound source direction that is set by a user. The sound source direction of the played recording data is different when the direction that is set by the user is different such that a recording play direction can be adjusted.

In a possible design, the obtaining unit is further configured to obtain a recording direction that is set by the user, where the recording direction is one of at least two sound source directions, and the at least two sound source directions are obtained by the at least three microphones at a same time point.

The processing unit is further configured to save, in the recording file, the recording direction obtained by the obtaining unit such that playing is performed according to the saved recording direction in a recording play process.

Optionally, the recording direction that is set by the user and that is obtained by the obtaining unit is determined according to a sound source adjustment gesture input by the user, and the sound source adjustment gesture is used to adjust the recording direction.

Optionally, the recording direction that is set by the user and that is obtained by the obtaining unit includes at least two different recording directions that are separately set by the user at different time such that the recording apparatus can adjust the recording direction.

According to a fourth aspect, a recording play apparatus is provided, including an obtaining unit, a processing unit, and a play unit. The obtaining unit is configured to obtain a recording file and determine a recording play direction, where the recording file saves recording data in all sound source directions input by at least three microphones, and the recording play direction is at least one of all the sound source directions.

The processing unit is configured to determine, in the recording file obtained by the obtaining unit and according to the recording play direction determined by the obtaining unit, recording data that matches the recording play direction.

The play unit is configured to play the recording data determined by the processing unit.

The recording play apparatus provided in this embodiment of the present disclosure can implement directional recording play. It may be understood that the recording play direction determined by the recording play apparatus may be any one or more of all the sound source directions. Therefore, the recording play apparatus provided in this embodiment of the present disclosure can implement a recording play function in which a sound source direction is adjustable.

Optionally, the recording file obtained by the obtaining unit saves a recording direction, the recording direction is one of at least two sound source directions, and the at least two sound source directions are obtained by the at least three microphones at a same time point.

The obtaining unit determines the recording play direction in the following manner, including determining that the recording play direction is the specified play direction if a user sets a specified play direction, or determining that the recording play direction is the recording direction if a user does not set a specified play direction.

Optionally, the specified play direction is determined according to a play direction adjustment gesture input by the user, and the play direction adjustment gesture is used to adjust the recording play direction.

In another possible design, the recording play direction obtained by the obtaining unit includes a first recording play direction and a second recording play direction, and the first recording play direction and the second recording play direction are different recording play directions that are set by the user at different time points.

The processing unit is configured to determine, in the recording file, recording data that matches the first recording play direction and recording data that matches the second recording play direction.

The obtaining unit is configured to obtain the play direction adjustment gesture input by the user, where the play direction adjustment gesture is used to adjust the recording play direction.

The play unit plays the determined recording data in the following manner, including playing first recording data, where the first recording data is the recording data that is determined by the processing unit in the recording file and that matches the first recording play direction, and switching, according to the play direction adjustment gesture obtained by the obtaining unit, from playing the first recording data to playing second recording data, where the second recording data is the recording data that is determined by the processing unit in the recording file and that matches the second recording play direction. Using this design, a recording play function in which a recording play direction can be switched and adjusted can be implemented.

According to a fifth aspect, a terminal is provided, where the terminal includes at least three microphones, a processor, a memory, and a bus, and the at least three microphones and the memory are all connected to the processor using the bus. The memory stores program code executed by the processor, the program code is a computer readable program, and the processor runs the program code in the memory to implement the recording method in the first aspect.

According to a sixth aspect, a terminal is provided, including a player, a processor, a memory, and a bus, where both the player and the memory are connected to the processor using the bus. The memory stores program code executed by the processor, the program code is a computer readable program, and the processor runs the program code in the memory to implement the recording play method in the second aspect.

DESCRIPTION OF EMBODIMENTS

The following clearly describes the technical solutions in the embodiments of the present disclosure with reference to the accompanying drawings in the embodiments of the present disclosure.

Figure 1:
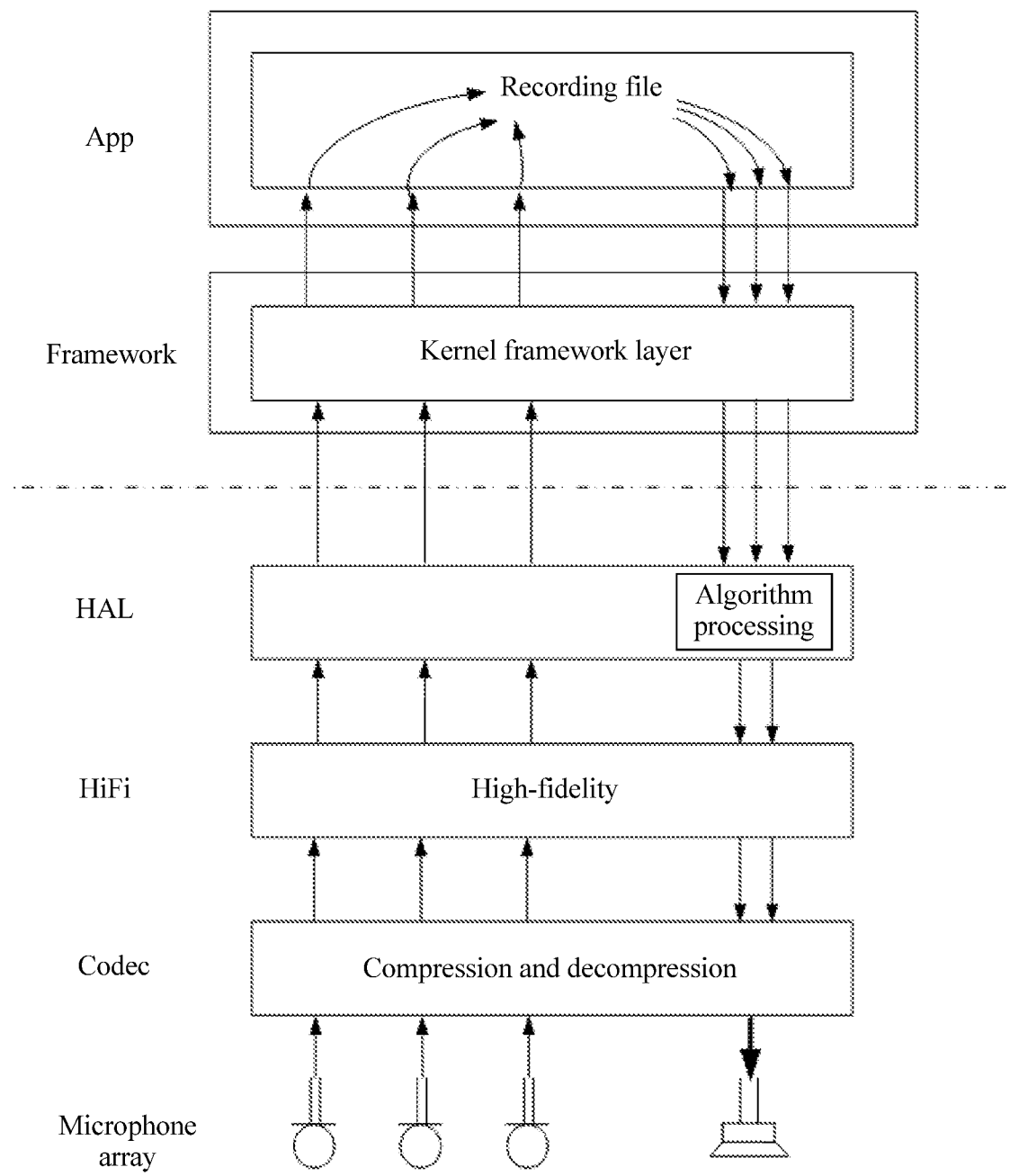
FIG. 1 shows a system architecture to which a recording method and a recording play method are applicable according to an embodiment of the present disclosure.

A recording method and a recording play method provided in the embodiments of the present disclosure may be applied to a system architecture shown in FIG. 1. As shown in FIG. 1, the system architecture for implementing recording and recording play mainly includes a microphone array used for sound collection and recording, a codec that supports video and audio compression and decompression, a high-fidelity (HiFi) module that enables a playback sound to be highly similar to an original sound, a hardware abstraction layer (HAL) that performs an algorithm operation, a kernel framework layer (Framework) that provides a standard interface conversion function and controls sound recording and recording play, and an application (designated as APP) that performs sound recording and recording play operations.

During technical implementation of the embodiments of the present disclosure, a sound source positioning technology and a directional play technology are used. Accordingly, three microphones are used as an example in the embodiments of the present disclosure, and brief descriptions are as follows.

Sound source positioning technology: It takes time to transmit a sound in the air, a combination of the three microphones is used to calculate differences between time at which a sound reaches the three microphones and a relative location of the microphone combination such that an azimuth of a sound source relative to a plane on which the microphones are located can be learned, and positioning of a sound source direction is implemented.

Directional play technology: Recording is performed using a combination of the three microphones, and each microphone may record an audio, three audio inputs may be combined to reduce noise, a sound in a specified direction is picked, and a sound in another direction is suppressed in order to improve a signal-to-noise ratio of the sound in the specified direction such that the sound in the specified direction can be highlighted, and a directional play function is implemented.

In the embodiments of the present disclosure, the microphone array may include at least three microphones. Multiple sounds may be recorded using combinations of different microphones. For ease of description, a processing process of sound recording is referred to as recording in the following in the embodiments of the present disclosure. In FIG. 1, a process in which the microphone array collects a sound and transmits the sound upward, and finally generates a recording file may be understood as a recording process. As shown in FIG. 1, an example in which three microphones perform recording is used for description. In a recording process, the microphone array inputs three audio inputs, and the three audio inputs include recording data in all sound source directions determined using the sound source positioning technology. In the embodiments of the present disclosure, the recording data may be understood as pulse code modulation (PCM) data, or may be understood as a PCM bitstream. The recording data in all the sound source directions is transmitted to the framework. The framework uses a specified function scheduling mechanism to combine, into a data stream, the recording data in all the sound source directions input by the microphones, and adds a file header in order to generate a recording file of a specified format. The recording file saves the recording data in all the sound source directions, that is, the recording file includes more than one piece of recording data, and each piece of recording data has a sound source direction that matches the recording data. In the embodiments of the present disclosure, the recording file may be understood as, for example, a WAV file. The WAV file includes the recording data in all the sound source directions, and a format of the file is identified as a WAV file using the file header. In FIG. 1, a process in which the recording file is processed by the framework and the HAL using an algorithm and is finally output using a speaker may be understood as a recording play process. In the embodiments of the present disclosure, if a user needs to play the recording file, the framework removes the file header of the recording file to obtain the recording data. The HAL obtains, with reference to a specified recording play direction and from all the recording data that is in all the sound source directions and that is recorded by the microphones, recording data in the recording play direction by means of matching, and plays the recording data in the specified recording play direction using the directional play technology and corresponding algorithm processing. The recording data in the specified recording play direction may be played in the following manner. Processing the matched recording data in the recording play direction as a stereophonic file that supports binaural playing with both an audio-left channel and an audio-right channel (a process of changing three arrows into two arrows shown in FIG. 1), and finally playing, using the speaker and in a form of one audio, the stereophonic file that supports both audio-left channel playing and audio-right channel playing (a process of changing two arrows into one arrow shown in FIG. 1).

The recording method and the recording play method provided in the embodiments of the present disclosure may be applied to a mobile terminal. A recording apparatus for implementing a recording function and a recording play apparatus for implementing a recording play function may be used as a part of the mobile terminal or may exist independently. It may be understood that the mobile terminal in the embodiments of the present disclosure may be a terminal that has recording and recording play functions, such as a smartphone.

The recording method in the embodiments of the present disclosure is described in detail below.

Figure 2:
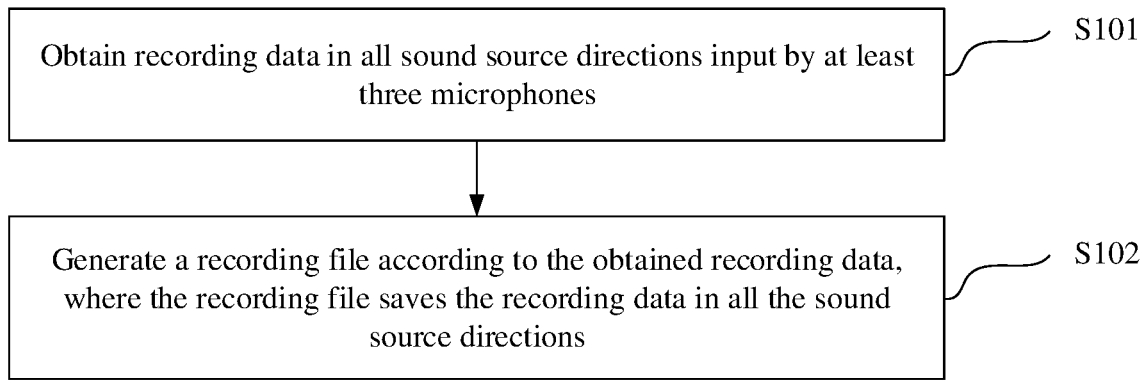
FIG. 2 is an implementation flowchart of a recording method according to an embodiment of the present disclosure.

In an embodiment of the present disclosure, refer to FIG. 2 for an implementation flowchart of a method for recording by a recording apparatus. As shown in FIG. 2, the method includes the following steps.

Step S101. Obtain recording data in all sound source directions.

Further, in this embodiment of the present disclosure, the recording apparatus may collect sounds in all the sound source directions using a microphone array. The microphone array includes at least three microphones, and sound source directions in 360° azimuths relative to a plane on which the microphones are located may be collected using the at least three microphones. Therefore, if all the 360° azimuths relative to the plane on which the microphones are located have sound sources that make sounds, all the sound source directions may be understood as all sound source directions that make sounds and that are in the 360° azimuths relative to the plane on which the microphones are located.

Step S102. Generate a recording file, where the recording file saves the recording data in all the sound source directions.

In this embodiment of the present disclosure, the recording apparatus may save, as the recording file in a storage location corresponding to an application for implementing a recording function, all the recording data that is in all the sound source directions and that is collected by the microphone array, that is, generate the recording file that can implement a recording play function.

In this embodiment of the present disclosure, the recording apparatus saves all the recording data in all the sound source directions in the recording file such that the complete recording data is retained. When recording is played subsequently, sounds in all the sound source directions can be played, and a recording play direction can be adjusted according to a direction that is set by a user.

In a process in which the user uses the recording apparatus to perform recording, it is inevitable that sounds in multiple sound source directions exist at a same time point, but the user may focus on only a specific sound source direction. For example, in a conference process, discussion is heated in the conference, but the user focuses on a speech of only a key role. Optionally, in this embodiment of the present disclosure, the user may set a sound source direction in which a sound that needs to be recorded is located, and set the specified sound source direction in which the sound that needs to be recorded is located as a recording direction. The recording apparatus obtains the recording direction that is set by the user and saves the recording direction in the recording file such that when the recording file is played, playing can be performed according to the specified recording direction.

Figure 3:
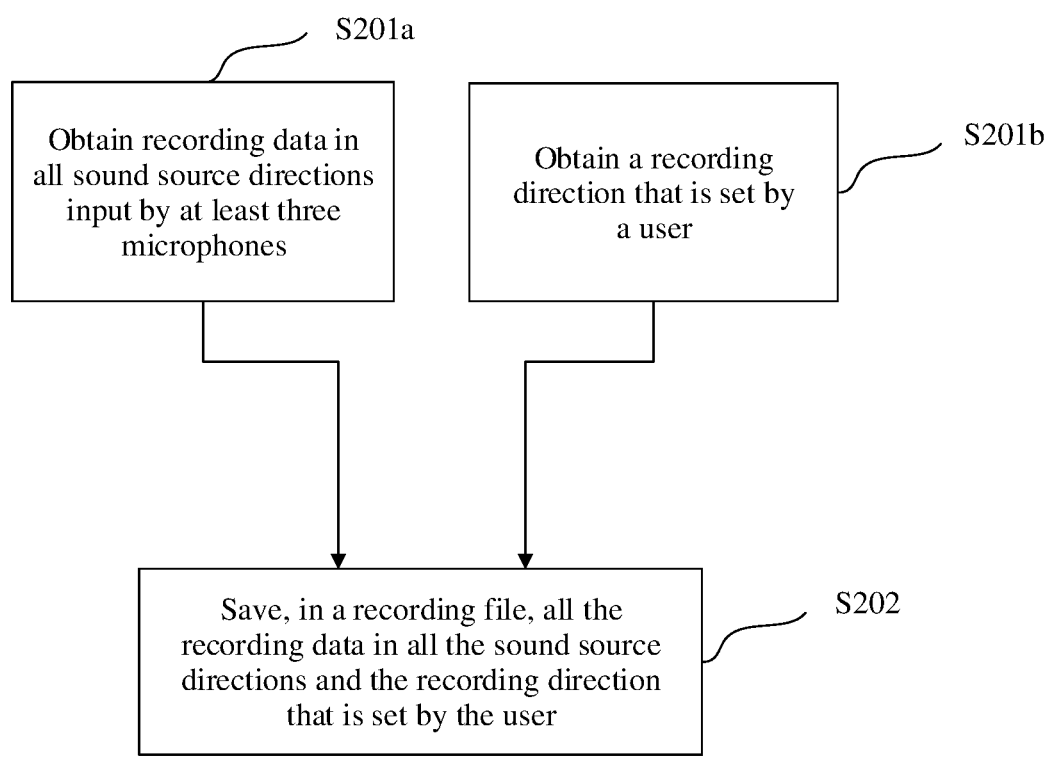
FIG. 3 is another implementation flowchart of a recording method according to an embodiment of the present disclosure.

Refer to FIG. 3 for an implementation process in which a recording apparatus performs recording and saves a recording direction in a recording file. FIG. 3 shows another implementation flowchart of recording by the recording apparatus according to an embodiment of the present disclosure. As shown in FIG. 3, the method includes the following steps.

Step S201a. Obtain recording data in all sound source directions input by at least three microphones.

Step S201b. Obtain a recording direction that is set by a user.

In this embodiment of the present disclosure, the recording direction is one of at least two sound source directions, and the at least two sound source directions are obtained by the at least three microphones at a same time point. In other words, in this embodiment of the present disclosure, on the basis of recording the recording data in all the sound source directions, the recording apparatus may emphatically record, according to the recording direction that is set by the user, recording data corresponding to the specified recording direction.

Step S202. Save, in a recording file, all the recording data in all the sound source directions and the recording direction that is set by the user.

It should be noted that a recording process and sound source positioning are two different implementation processes. Therefore, in this embodiment of the present disclosure, an execution sequence of obtaining the recording direction that is set by the user and performing the steps of the recording process shown in FIG. 1 is not limited, and step S201a and step S201b in FIG. 3 are not performed in a sequence.

It should be understood that in this embodiment of the present disclosure, the recording data in all the sound source directions input by the at least three microphones is a set formed by recording data in sound source directions obtained by the at least three microphones at different time points, and there may be more than one sound source direction obtained by the at least three microphones at a same time point. In this embodiment of the present disclosure, the embodiment corresponding to the method shown in FIG. 3 is described using an example in which the at least three microphones obtain at least two sound source directions at a same time point.

Further, in this embodiment of the present disclosure, the recording direction that is set by the user is determined according to a sound source adjustment gesture input by the user, and the sound source adjustment gesture is used to adjust the recording direction. The recording method provided in this embodiment of the present disclosure may be applied to a mobile terminal having a touchscreen. Therefore, the user may input the specified recording direction using the touchscreen.

Further, in this embodiment of the present disclosure, a sound source direction mark may be displayed on a touchscreen display interface. The sound source direction mark is used to mark a sound source direction. For example, in this embodiment of the present disclosure, the sound source direction mark may be a pointer. The user adjusts the sound source direction mark to adjust the recording direction. Therefore, the recording apparatus may obtain, in the following manner, the recording direction that is set by the user, obtaining the sound source adjustment gesture input by the user. For example, the sound source adjustment gesture may be input using a gesture of touching and tapping, sliding, or the like by a finger on the touchscreen display interface, or may be input using an air gesture or the like. This is not limited in this embodiment of the present disclosure. In this embodiment of the present disclosure, if the user inputs the sound source adjustment gesture, the recording apparatus may determine, according to the sound source adjustment gesture, a display location of an adjusted sound source direction mark on the touchscreen display interface, and determine that a sound source direction indicated by the display location of the adjusted sound source direction mark on the touchscreen display interface is the recording direction that is set by the user.

During specific implementation, in this embodiment of the present disclosure, a pointer used to identify a sound source direction may be set and displayed on a display interface of the mobile terminal in a recording process in order to indicate a sound source direction. The user may adjust, on the touchscreen, the pointer used to identify a sound source direction. The recording apparatus obtains an adjustment track of the adjustment, by the user on the touchscreen, of the pointer used to identify a sound source direction, and determines that a location indicated by an end point of the adjustment track is the recording direction. For example, in a conference room, after the user starts a sound recorder application in the mobile terminal, a pointer used to identify a sound source direction may be displayed on a display interface that displays a sound recorder, and the pointer points to a direction in which a person makes a speech. Discussion is heated and many people speak in the conference, but the user may focus on only a key role that makes a speech. Therefore, a pointing direction of the pointer may be adjusted to a sound source direction in which the key role makes a speech, and the direction is set to the recording direction. The recording apparatus obtains the specified recording direction and saves the recording direction in the recording file such that when the recording file is played, playing can be performed according to the saved recording direction.

Further, in this embodiment of the present disclosure, the user may separately set different recording directions at different time, that is, the recording direction that is set by the user includes at least two different recording directions that are separately set by the user at different time such that the recording direction can be adjusted at any time according to the recording direction specified by the user in the recording process, and recording in a corresponding sound source direction can be implemented. For example, in a conference discussion process, the user may focus on speeches of different roles at different time, for example, focuses on a speech of a role A at time TA and focuses on a speech of a role B at time TB. Therefore, the user may set, at the time TA, the recording direction to a sound source direction in which the role A is located, input a sound source adjustment gesture at the time TB, and adjust the recording direction to a sound source direction in which the role B is located. The recording apparatus emphatically records, at the time TA, a sound in the sound source direction in which the role A is located, switches the recording direction after obtaining the sound source adjustment gesture of the user for adjusting the recording direction to the sound source direction in which the role B is located, and emphatically records, at the time TB, a sound in the sound source direction in which the role B is located.

Figure 4:
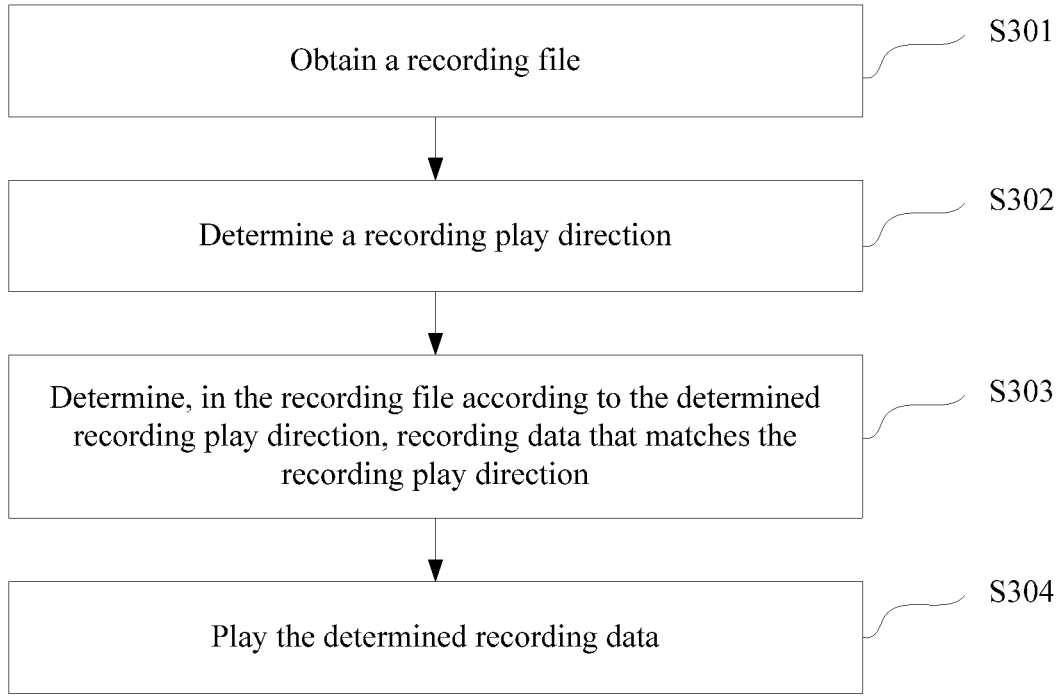
FIG. 4 is an implementation flowchart of a recording play method according to an embodiment of the present disclosure.

A method implementation process in which a recording play apparatus plays recording based on a recording file obtained using the recording play method provided in the foregoing embodiment is described in detail in an embodiment of the present disclosure below. FIG. 4 is an implementation flowchart of a recording play method provided in this embodiment of the present disclosure. As shown in FIG. 4, the method includes the following steps.

Step S301. Obtain a recording file.

In this embodiment of the present disclosure, the recording file obtained by the recording play apparatus saves recording data in all sound source directions input by at least three microphones.

Step S302. Determine a recording play direction.

In this embodiment of the present disclosure, the recording play direction may be understood as a sound source direction specified by a user, and the specified sound source direction is at least one sound source direction of all the sound source directions input by the at least three microphones.

In this embodiment of the present disclosure, the user may adjust the recording play direction by inputting a play direction adjustment gesture, for example, set the recording play direction by inputting the play direction adjustment gesture on a touchscreen display interface.

In this embodiment of the present disclosure, a sound source direction mark may be displayed on the touchscreen display interface, and the user adjusts the sound source direction mark by inputting the play direction adjustment gesture in order to adjust the recording play direction. The recording play apparatus obtains a display location of an adjusted sound source direction mark on the touchscreen display interface, and determines that a sound source direction indicated by the display location of the adjusted sound source direction mark on the touchscreen display interface is the recording play direction that is set by the user. For example, in this embodiment of the present disclosure, the user may set the recording play direction by adjusting a pointer used to identify a sound source direction, and the recording play apparatus may determine the recording play direction by obtaining a direction to which the pointer points.

Step S303. The recording play apparatus determines, in the recording file according to the determined recording play direction, recording data that matches the recording play direction.

Step S304. Play the determined recording data.

In this embodiment of the present disclosure, the recording play apparatus may perform, according to the determined recording play direction and the determined recording data, noise reduction processing on an audio output signal corresponding to the recording data in the recording play direction in order to improve a signal-to-noise ratio of the audio output signal corresponding to the recording data in the recording play direction, and play recording corresponding to the recording data in the recording play direction.

The recording play direction may be set and adjusted by the user. Therefore, in the present disclosure, a direction-adjustable recording play function can be implemented. For example, the recording play direction includes a first recording play direction and a second recording play direction, and the first recording play direction and the second recording play direction are different recording play directions that are set by the user at different time points. For example, the user sets the first recording play direction at a time point T1, and inputs the play direction adjustment gesture at a time point T2. The play direction adjustment gesture is used to adjust the recording play direction. The recording play apparatus may play the determined recording data in the following manner of playing first recording data, where the first recording data is recording data that is determined in the recording file and that matches the first recording play direction, obtaining the play direction adjustment gesture input by the user, where the play direction adjustment gesture is used to adjust the recording play direction, and switching, according to the play direction adjustment gesture, from playing the first recording data to playing second recording data, where the second recording data is recording data that is determined in the recording file and that matches the second recording play direction.

Figure 5:
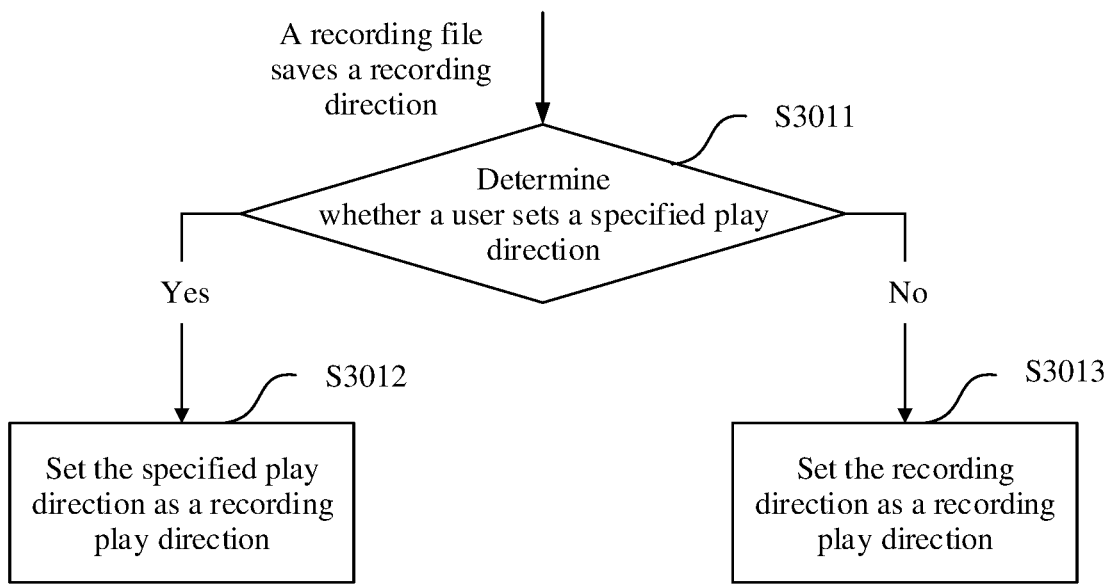
FIG. 5 is an implementation flowchart of determining a recording play direction according to an embodiment of the present disclosure.

Optionally, if the recording file saves a recording direction, the recording play direction may be determined according to a process of a method shown in FIG. 5. As shown in FIG. 5, the method includes the following steps.

Step S3011. Determine whether a user sets a specified play direction.

In this embodiment of the present disclosure, the specified play direction is determined according to the play direction adjustment gesture input by the user, and the play direction adjustment gesture is used to adjust the recording play direction. For example, whether the user inputs the sound source adjustment gesture on the touchscreen display interface may be determined. If the user inputs the sound source adjustment gesture on the touchscreen display interface, it is determined that the user sets the specified play direction, or if the user does not input the sound source adjustment gesture on the touchscreen display interface, it is determined that the user does not set the specified play direction.

Further, in this embodiment of the present disclosure, in a process in which the recording play apparatus or a mobile terminal having a recording play function plays the recording file, a pointer used to identify a sound source direction may be displayed on the display interface. Therefore, whether the user sets the specified play direction may be determined by determining whether the user adjusts the pointer used to identify a sound source direction. If the user adjusts the pointer for identifying a sound source direction, it is determined that the user sets the specified play direction, or if the user does not adjust the pointer for identifying a sound source direction, it is determined that the user does not set the specified play direction.

In this embodiment of the present disclosure, if the user sets the specified play direction, step S3012 is performed, or if the user does not set the specified play direction, step S3013 is performed.

Step S3012. If the user sets the specified play direction, set the specified play direction as the recording play direction.

Step S3013. If the user does not set the specified play direction, set the recording direction as the recording play direction.

In this embodiment of the present disclosure, if the recording file saves the recording direction, the recording play apparatus may use the saved recording direction as a default recording play direction, and plays recording according to the default recording play direction if the user does not specify the play direction, or plays recording according to the play direction specified by the user if the user specifies the play direction.

Figure 6:
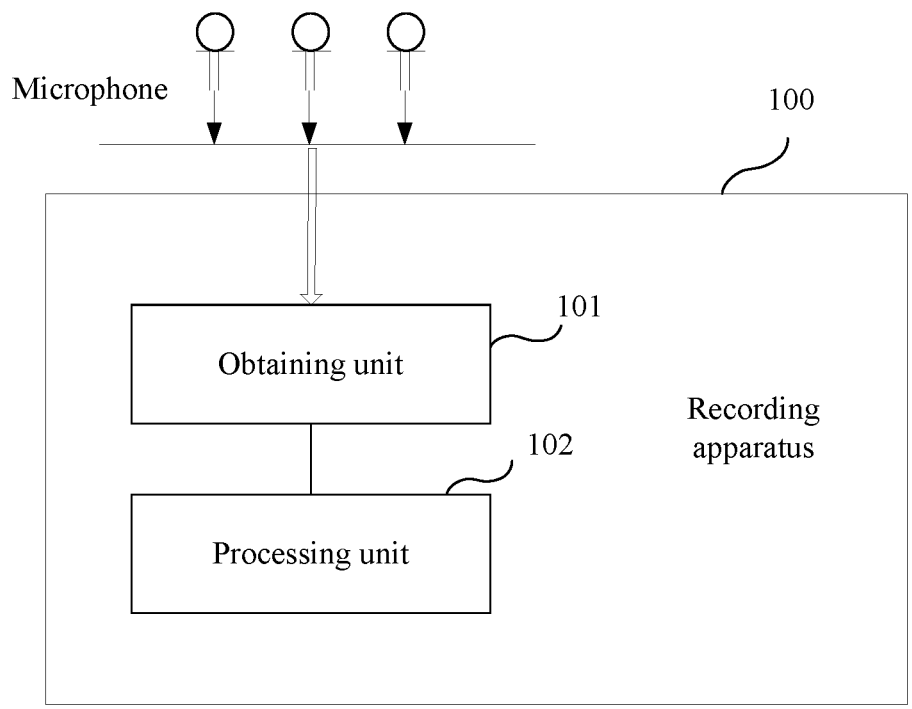
FIG. 6 is a schematic diagram of composition of a recording apparatus according to an embodiment of the present disclosure.

On the basis of the recording method provided in the foregoing embodiments, an embodiment of the present disclosure provides a recording apparatus. FIG. 6 is a schematic diagram of composition of a recording apparatus 100 provided in this embodiment of the present disclosure. As shown in FIG. 6, the recording apparatus 100 includes an obtaining unit 101 and a processing unit 102.

The obtaining unit 101 is configured to obtain recording data in all sound source directions input by at least three microphones.

The processing unit 102 is configured to generate a recording file according to the recording data obtained by the obtaining unit 101, where the recording file saves the recording data in all the sound source directions input by the at least three microphones.

In this embodiment of the present disclosure, the recording apparatus 100 saves, in the recording file, all the recording data in all the sound source directions input by the at least three microphones such that the complete recording data is retained. When recording is played subsequently, recording data in a corresponding sound source direction can be played according to the sound source direction that is set by a user. The sound source direction of the played recording data is different when the direction that is set by the user is different such that a recording play direction can be adjusted.

In this embodiment of the present disclosure, the obtaining unit 101 is further configured to obtain a recording direction that is set by the user, where the recording direction is one of at least two sound source directions, and the at least two sound source directions are obtained by the at least three microphones at a same time point.

The processing unit 102 is further configured to save, in the recording file, the recording direction obtained by the obtaining unit 101 such that playing is performed according to the saved recording direction in a recording play process.

Optionally, the recording direction that is set by the user and that is obtained by the obtaining unit 101 is determined according to a sound source adjustment gesture input by the user, and the sound source adjustment gesture is used to adjust the recording direction.

Optionally, the recording direction that is set by the user and that is obtained by the obtaining unit 101 includes at least two different recording directions that are separately set by the user at different time such that the recording apparatus 100 can adjust the recording direction.

The recording apparatus 100 provided in this embodiment of the present disclosure may be configured to implement the recording method in the foregoing embodiment and has all functions for implementing a recording process in the foregoing embodiment. For a specific implementation process, refer to related descriptions in the foregoing embodiment and the accompanying drawing, and details are not described herein again.

Figure 7A:
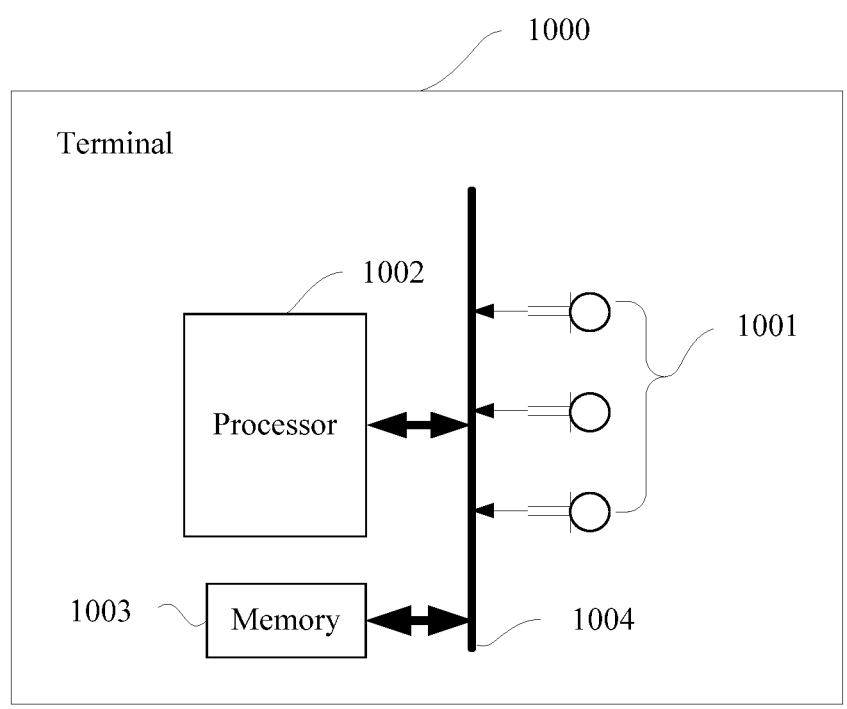
FIG. 7A and FIG. 7B are schematic diagrams of composition of a terminal according to an embodiment of the present disclosure.

An embodiment of the present disclosure further provides a terminal. FIG. 7A is a schematic diagram of composition of the terminal 1000 provided in this embodiment of the present disclosure. As shown in FIG. 7A, the terminal 1000 includes at least three microphones 1001, a processor 1002, a memory 1003, and a bus 1004. The at least three microphones 1001 and the memory 1003 are all connected to the processor 1002 using the bus 1004.

The memory 1003 is configured to store program code executed by the processor 1002.

The at least three microphones 1001 are configured to input recording data in all sound source directions.

The processor 1002 is configured to obtain the recording data in all the sound source directions input by the at least three microphones 1001, and generate a recording file according to the obtained recording data, where the recording file saves the recording data in all the sound source directions.

Figure 7B:
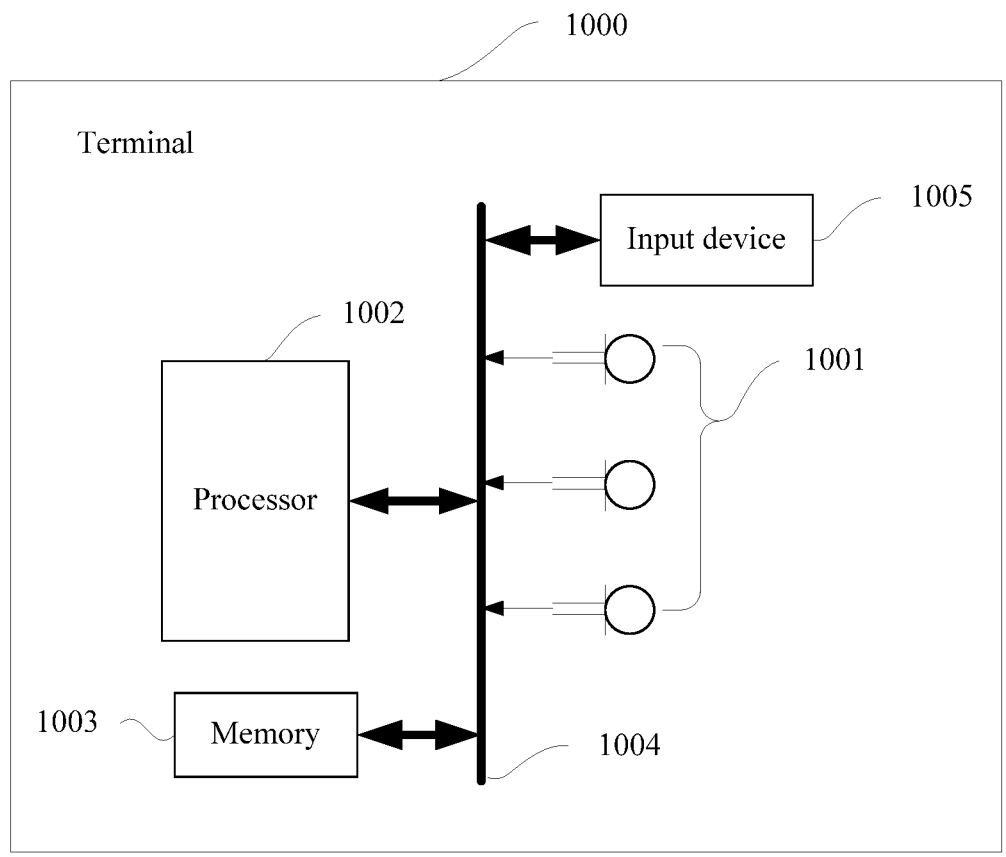

The terminal 1000 further includes an input device. As shown in FIG. 7B, an input device 1005 is connected to the processor 1002 using the bus 1004.

The input device 1005 is configured to obtain a recording direction that is set by a user, where the recording direction is one of at least two sound source directions, and the at least two sound source directions are obtained by the at least three microphones 1001 at a same time point.

The processor 1002 is further configured to save, in the recording file, the recording direction obtained by the input device 1005.

Optionally, the recording direction that is set by the user and that is obtained by the input device 1005 is determined according to a sound source adjustment gesture input by the user, and the sound source adjustment gesture is used to adjust the recording direction.

Optionally, the recording direction that is set by the user and that is obtained by the input device 1005 includes at least two different recording directions that are separately set by the user at different time.

It should be noted that in this embodiment of the present disclosure, the input device 1005 may be a touchscreen or the like.

The bus 1004 may include a channel for conveying information between components of a computer.

The processor 1002 may be a general-purpose central processing unit (CPU), a microprocessor, an application-specific integrated circuit (ASIC), or one or more integrated circuits used to control program execution of the solution in the present disclosure. One or more memories included in a computer system may be a read-only memory (ROM) or a static storage device of another type that is capable of storing static information and a static instruction, a random access memory (RAM) or a dynamic storage device of another type that is capable of storing information and an instruction, or may be a magnetic disk memory. These memories are connected to the processor 1002 using the bus 1004.

The memory 1003, such as a RAM, stores an operating system and a program that is used to execute the solution in the present disclosure. The operating system is a program that is used to control running of another program and manage a system resource.

A program stored in the memory 1003 is used to instruct the processor 1002 to execute the recording method in the embodiments of the present disclosure.

It may be understood that the terminal 1000 in this embodiment may be configured to implement all functions in the foregoing embodiment related to the recording method. For a specific implementation process, refer to related descriptions in the foregoing method embodiment, and details are not described herein again.

An embodiment of the present disclosure further provides a computer storage medium that is configured to store computer software instructions used by the recording apparatus 100 and the terminal 1000, and the computer software instructions include the programs that are used to execute the foregoing method embodiments. A recording function can be implemented by executing the stored programs.

Figure 8:
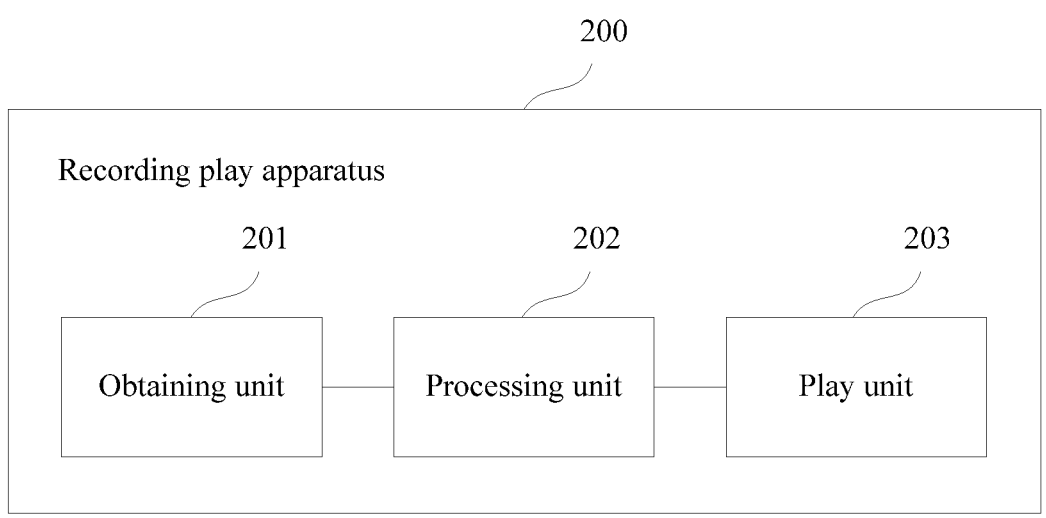
FIG. 8 is a schematic diagram of composition of a recording play apparatus according to an embodiment of the present disclosure.

Based on the recording play method provided in the foregoing embodiment, an embodiment of the present disclosure provides a recording play apparatus 200. FIG. 8 is a schematic diagram of composition of the recording play apparatus 200 according to this embodiment of the present disclosure. As shown in FIG. 8, the recording play apparatus 200 includes an obtaining unit 201, a processing unit 202, and a play unit 203.

The obtaining unit 201 is configured to obtain a recording file and determine a recording play direction, where the recording file saves recording data in all sound source directions input by at least three microphones, and the recording play direction is at least one of all the sound source directions.

The processing unit 202 is configured to determine, in the recording file obtained by the obtaining unit 201 and according to the recording play direction determined by the obtaining unit 201, recording data that matches the recording play direction.

The play unit 203 is configured to play the recording data determined by the processing unit 202.

The recording play apparatus 200 provided in this embodiment of the present disclosure can implement directional recording play. It may be understood that the recording play direction determined by the recording play apparatus 200 may be any one or more of all the sound source directions. Therefore, the recording play apparatus 200 provided in this embodiment of the present disclosure can implement a recording play function in which a sound source direction is adjustable.

Optionally, the recording file obtained by the obtaining unit 201 saves a recording direction, the recording direction is one of at least two sound source directions, and the at least two sound source directions are obtained by the at least three microphones at a same time point.

The obtaining unit 201 determines the recording play direction in the following manner, including determining that the recording play direction is the specified play direction if a user sets a specified play direction, or determining that the recording play direction is the recording direction if a user does not set a specified play direction.

Optionally, the specified play direction is determined according to a play direction adjustment gesture input by the user, and the play direction adjustment gesture is used to adjust the recording play direction.

Optionally, the recording play direction obtained by the obtaining unit 201 includes a first recording play direction and a second recording play direction, and the first recording play direction and the second recording play direction are different recording play directions that are set by the user at different time points.

The processing unit 202 is configured to determine, in the recording file, recording data that matches the first recording play direction and recording data that matches the second recording play direction.

The obtaining unit 201 is configured to obtain the play direction adjustment gesture input by the user, where the play direction adjustment gesture is used to adjust the recording play direction.

The play unit 203 plays the determined recording data in the following manner, including playing first recording data, where the first recording data is the recording data that is determined by the processing unit 202 in the recording file and that matches the first recording play direction, and switching, according to the play direction adjustment gesture obtained by the obtaining unit 201, from playing the first recording data to playing second recording data, where the second recording data is the recording data that is determined by the processing unit 202 in the recording file and that matches the second recording play direction. Using this design, a recording play function in which a recording play direction can be switched and adjusted can be implemented.

The recording play apparatus 200 provided in this embodiment of the present disclosure may be configured to implement the recording play method in the foregoing embodiment and has all functions for implementing a recording play process in the foregoing embodiment. For a specific implementation process, refer to related descriptions in the foregoing embodiment and the accompanying drawing, and details are not described herein again.

Figure 9A:
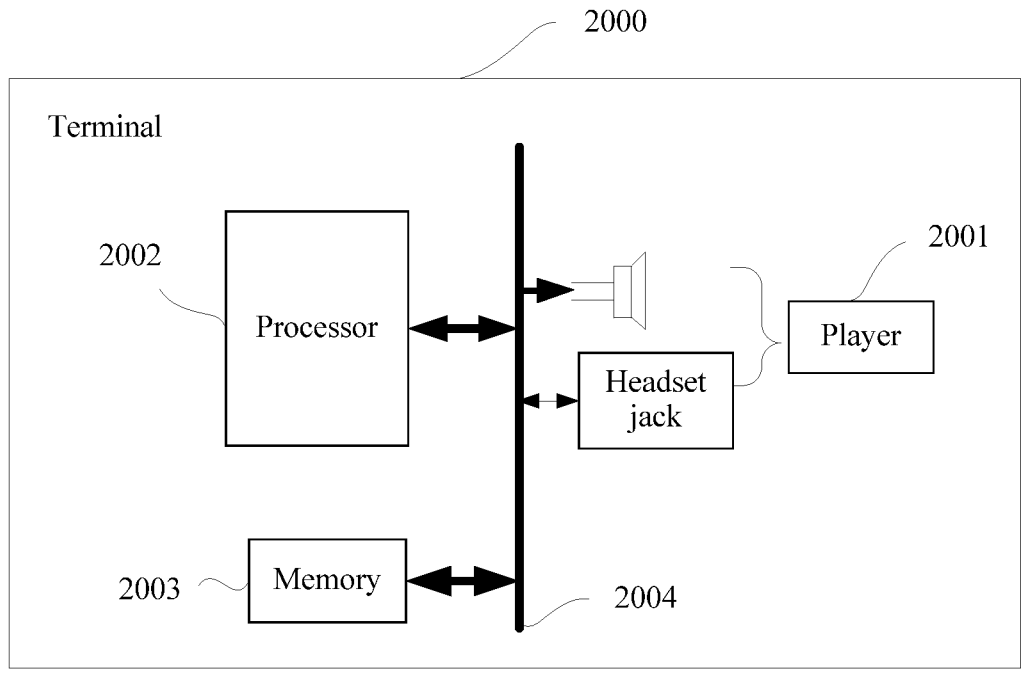
FIG. 9A and FIG. 9B are schematic diagrams of composition of a terminal according to an embodiment of the present disclosure.

An embodiment of the present disclosure further provides a terminal 2000. FIG. 9A is a schematic diagram of composition of the terminal 2000 according to this embodiment of the present disclosure. As shown in FIG. 9A, the terminal 2000 provided in this embodiment of the present disclosure includes a player 2001, a processor 2002, a memory 2003, and a bus 2004. Both the player 2001 and the memory 2003 are connected to the processor 2002 using the bus 2004.

The memory 2003 is configured to store program code executed by the processor 2002.

The processor 2002 is configured to obtain a recording file, determine a recording play direction, and determine, in the obtained recording file according to the determined recording play direction, recording data that matches the recording play direction, where the recording file saves recording data in all sound source directions input by at least three microphones, and the recording play direction is at least one of all the sound source directions input by the at least three microphones.

The player 2001 is configured to play the recording data determined by the processor 2002.

Optionally, the recording file obtained by the processor 2002 saves a recording direction, the recording direction is one of at least two sound source directions, and the at least two sound source directions are obtained by the at least three microphones at a same time point.

Figure 9B:
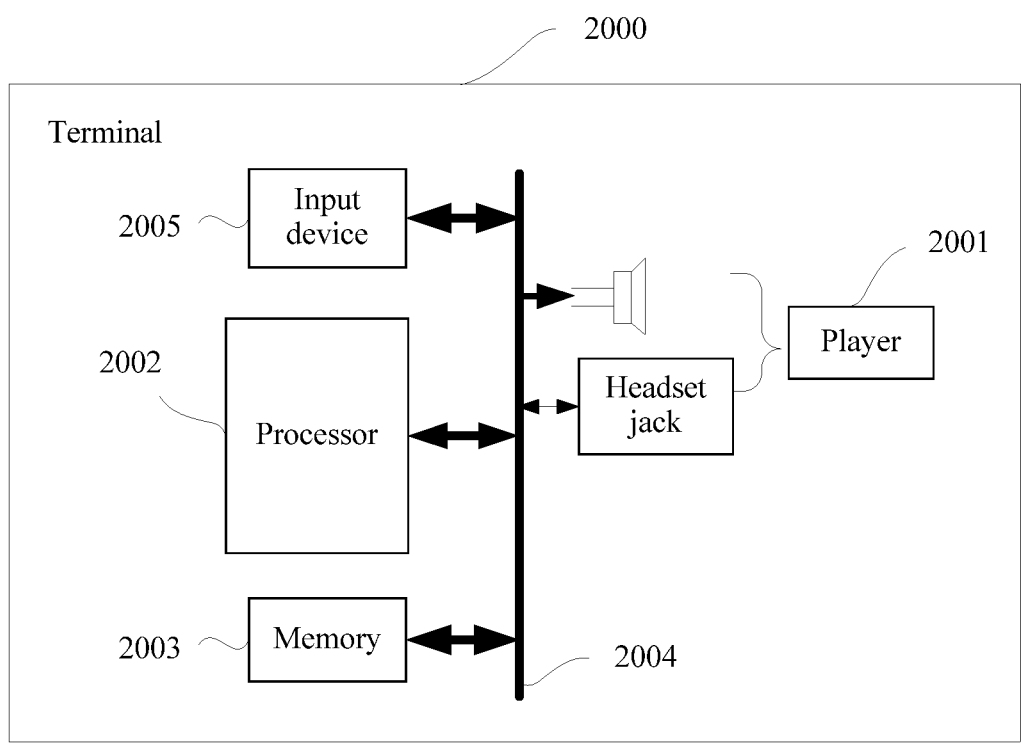

The terminal 2000 further includes an input device. As shown in FIG. 9B, the input device 2005 is configured to obtain a specified play direction that is set by a user.

The processor 2002 determines the recording play direction in the following manner, including if the input device 2005 obtains the specified play direction that is set by the user, the processor 2002 uses the specified play direction as the recording play direction, or if the input device 2005 does not obtain the specified play direction that is set by the user, the processor 2002 uses the recording direction as the recording play direction.

Further, the input device 2005 may be configured to obtain, in the following manner, the specified play direction that is set by the user, including obtaining, by the input device 2005, a play direction adjustment gesture input by the user, where the play direction adjustment gesture is used to adjust the recording play direction, and determining the specified play direction according to the play direction adjustment gesture input by the user.

Optionally, the recording play direction obtained by the processor 2002 includes a first recording play direction and a second recording play direction, and the first recording play direction and the second recording play direction are different recording play directions that are set by the user at different time points. The processor 2002 is configured to determine, in the recording file, recording data that matches the first recording play direction and recording data that matches the second recording play direction.

The terminal 2000 includes an input device 2005, where the input device 2005 is configured to obtain a play direction adjustment gesture that is input by the user and that is used to adjust the first recording play direction.

The player 2001 plays the determined recording data in the following manner, including playing first recording data, where the first recording data is the recording data that is determined by the processor 2002 in the recording file and that matches the first recording play direction, and switching, according to the play direction adjustment gesture that is obtained by the input device 2005 and that is used to adjust the first recording play direction, from playing the first recording data to playing second recording data, where the second recording data is the recording data that is determined by the processor 2002 in the recording file and that matches the second recording play direction.

It should be noted that in this embodiment of the present disclosure, the input device 2005 may be a touchscreen or the like.

The player 2001 may be a headset interface, a speaker, or the like, and is configured to play the recording data.

The bus 2004 may include a channel for conveying information between components of a computer.

The processor 2002 may be a general-purpose CPU, a microprocessor, an ASIC, or one or more integrated circuits used to control program execution of the solution in the present disclosure. One or more memories included in a computer system may be a ROM or a static storage device of another type that is capable of storing static information and a static instruction, a RAM or a dynamic storage device of another type that is capable of storing information and an instruction, or may be a magnetic disk memory. These memories are connected to the processor using the bus.

The memory 2003, such as a RAM, stores an operating system and a program that is used to execute the solution in the present disclosure. The operating system is a program that is used to control running of another program and manage a system resource.

A program stored in the memory 2003 is used to instruct the processor 2002 to execute the recording play method in the embodiments of the present disclosure.

It may be understood that the terminal 2000 in this embodiment may be configured to implement all functions in the foregoing embodiment related to the recording play method. For a specific implementation process, refer to related descriptions in the foregoing method embodiment, and details are not described herein again.

An embodiment of the present disclosure further provides a computer storage medium that is configured to store a computer software instruction used by the recording play apparatus 200 or the terminal 2000, and the computer software instruction includes the program that is used to execute the foregoing method embodiment. A recording play function can be implemented by executing the stored program.

Although the present disclosure is described with reference to the embodiments, in a process of implementing the present disclosure that claims protection, a person skilled in the art may understand and implement another variation of the disclosed embodiments by viewing the accompanying drawings, disclosed content, and the accompanying claims. In the claims, "comprising" does not exclude another component or another step, and "a" or "one" does not exclude a case of multiple. A single processor or another unit may implement several functions enumerated in the claims. Some measures are recorded in dependent claims that are different from each other, but this does not mean that these measures cannot be combined to produce a better effect.

A person skilled in the art should understand that the embodiments of the present disclosure may be provided as a method, an apparatus (device), or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a compact disc ROM (CD-ROM), an optical memory, and the like) that include computer-usable program code. The computer program is stored/distributed in a proper medium and is provided as or used as a part of the hardware together with another hardware, or may also use another allocation form, such as using the Internet or another wired or wireless telecommunications system.

The present disclosure is described with reference to the flowcharts and/or block diagrams of the method, the apparatus (device), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine such that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner such that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device such that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although the present disclosure is described with reference to specific features and the embodiments thereof, obviously, various modifications and combinations may be made to them without departing from the spirit and scope of the present disclosure. Correspondingly, the specification and accompanying drawings are merely example description of the present disclosure defined by the accompanying claims, and is considered as any of or all modifications, variations, combinations or equivalents that cover the scope of the present disclosure.

Obviously, a person skilled in the art can make various modifications and variations to the present disclosure without departing from the spirit and scope of the present disclosure. The present disclosure is intended to cover these modifications and variations provided that they fall within the scope of protection defined by the following claims and their equivalent technologies.

What is claimed is:

1. A terminal, comprising:
   a screen;
   a microphone array;
   a processor; and
   a memory coupled to the processor and storing instructions that, when executed by the processor, cause the terminal to:
      obtain a recording file, wherein the recording file comprises saved recording data input from all sound source directions by the microphone array;
      receive a first gesture on an interface on the screen, wherein the first gesture indicates a first recording play direction;
      determine, according to the first gesture, first recording data matching the first recording play direction from the recording file;
      play the first recording data;
      receive a second gesture on the interface, wherein the second gesture indicates a second recording play direction;
      determine, according to the second gesture, second recording data matching the second recording play direction from the recording file; and
      play the second recording data.

2. The terminal of claim 1, wherein the interface comprises a first identifier associated with a first sound source direction, and wherein the first recording play direction is indicated by the first gesture on the first identifier.

3. The terminal of claim 1, wherein the interface further comprises a second identifier associated with a second sound source direction, and wherein the second recording play direction is indicated by the second gesture on the second identifier.

4. The terminal of claim 1, wherein the first recording play direction and the second recording play direction comprise different recording play directions at different time points.

5. The terminal of claim 1, wherein the first sound source direction and the second sound source direction are obtained by the microphone array at a same time point.

6. The terminal of claim 1, wherein the instructions further cause the terminal to:
   process the first recording data as a stereophonic file that supports binaural playing with both an audio-left channel and an audio-right channel; and
   play the stereophonic file in a form of one audio output.

7. The terminal of claim 1, wherein before the first gesture is received, the instructions further cause the terminal to play the recording file according to a default recording play direction.

8. A method for a terminal comprising a screen and a microphone array, the method comprising:
   obtaining a recording file, wherein the recording file comprises saved recording data input from all sound source directions by the microphone array;
   playing the recording file according to a default recording play direction;
   receiving a first gesture on an interface displayed on the screen, wherein the first gesture indicates a first recording play direction;
   determining, according to the first gesture, first recording data matching the first recording play direction from the recording file; and
   playing the first recording data.

9. The method of claim 8 further comprising:
   receiving a second gesture on the interface, wherein the second gesture indicates a second recording play direction;
   determining, according to the second gesture, a second recording data matching the second recording play direction from the recording file; and
   playing the second recording data.

10. The method of claim 9, wherein the interface further comprises a second identifier associated with a second sound source direction, and wherein the second recording play direction is indicated by the second gesture on the second identifier.

11. The method of claim 9, wherein the first sound source direction and the second sound source direction are obtained by the microphone array at a same time point.

12. The method of claim 9, wherein the first recording play direction and the second recording play direction comprise different recording play directions at different time points.

13. The method of claim 8, wherein the interface comprises a first identifier associated with a first sound source direction, and wherein the first recording play direction is indicated by the first gesture on the first identifier.

14. The method of claim 8, wherein playing the first recording data matching the first recording play direction further comprises:
processing the first recording data as a stereophonic file that supports binaural playing with both an audio-left channel and an audio-right channel; and
playing the stereophonic file in one audio output.

15. A computer program product comprising computer-executable instructions for storage on a non-transitory computer-readable storage medium that, when executed by a processor, cause an apparatus to:
obtain a recording file, wherein the recording file comprises saved recording data input from all sound source directions by a microphone array;
receive a first gesture on an interface displayed on a screen, wherein the first gesture indicates a first recording play direction;
determine, according to the first gesture, a first recording data matching the first recording play direction from the recording file;
play the first recording data;
receive a second gesture on the interface, wherein the second gesture indicates a second recording play direction;
determine, according to the second gesture, second recording data matching the second recording play direction from the recording file; and
play the second recording data.

16. The computer program product of claim 15, wherein the interface comprises a first identifier associated with a first sound source direction, and wherein the first recording play direction is indicated by the first gesture on the first identifier.

17. The computer program product of claim 15, wherein the interface further comprises a second identifier associated with a second sound source direction, and wherein the second recording play direction is indicated by the second gesture on the second identifier.

* * * * *